US008799516B2

(12) United States Patent  (10) Patent No.: US 8,799,516 B2
Libman  (45) Date of Patent: Aug. 5, 2014

(54) METHOD AND APPARATUS FOR STORING REAL-TIME TEXT MESSAGES

(75) Inventor: Marina Libman, Pikesville, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1432 days.

(21) Appl. No.: 11/878,704

(22) Filed: Jul. 26, 2007

(65) Prior Publication Data

US 2007/0271395 A1 Nov. 22, 2007

Related U.S. Application Data

(62) Division of application No. 09/941,582, filed on Aug. 30, 2001, now abandoned.

(51) Int. Cl.
*G06F 15/16* (2006.01)
*G06F 17/30* (2006.01)
*H04L 12/58* (2006.01)

(52) U.S. Cl.
CPC ........ *G06F 17/30716* (2013.01); *H04L 12/589* (2013.01); *H04L 51/00* (2013.01); *H04L 51/06* (2013.01)
USPC .......................................... 709/246; 709/206

(58) Field of Classification Search
CPC . G06F 17/30716; H04L 12/589; H04L 51/00; H04L 51/06
USPC ............................ 709/204, 206, 246; 702/187
See application file for complete search history.

(56) References Cited

U.S. PATENT DOCUMENTS

| 5,848,134 | A | 12/1998 | Sekiguchi et al. | |
|---|---|---|---|---|
| 6,212,548 | B1 | 4/2001 | DeSimone et al. | |
| 6,393,461 | B1 * | 5/2002 | Okada et al. | 709/204 |
| 6,438,561 | B1 * | 8/2002 | Israni et al. | 455/457 |
| 6,484,196 | B1 * | 11/2002 | Maurille | 709/206 |
| 6,549,937 | B1 * | 4/2003 | Auerbach et al. | 709/206 |
| 6,594,693 | B1 | 7/2003 | Borwankar | |
| 6,678,720 | B1 | 1/2004 | Matsumoto et al. | |
| 6,941,345 | B1 * | 9/2005 | Kapil et al. | 709/206 |
| 7,512,655 | B2 * | 3/2009 | Armstrong et al. | 709/205 |
| 2001/0003202 | A1 * | 6/2001 | Mache et al. | 713/153 |
| 2001/0012302 | A1 * | 8/2001 | Gaffney | 370/486 |
| 2001/0029455 | A1 | 10/2001 | Chin et al. | |
| 2002/0007398 | A1 | 1/2002 | Mendiola et al. | |
| 2002/0069069 | A1 | 6/2002 | Kanevsky et al. | |
| 2002/0108091 | A1 | 8/2002 | Flanagin et al. | |
| 2002/0165000 | A1 | 11/2002 | Fok | |
| 2002/0173308 | A1 * | 11/2002 | Dorenbosch et al. | 455/435 |
| 2002/0178222 | A1 | 11/2002 | O'Hara et al. | |

* cited by examiner

*Primary Examiner* — Brian J Gillis
(74) *Attorney, Agent, or Firm* — William H. Bollman

(57) ABSTRACT

A synchronization ("synch") module may reside on a source computing platform and a destination computing platform. The synch module may be configured to operate as a source synch module or a destination synch module depending on which computing platform is a data source. As an data source or initiator, the synch module may be configured to transfer data, e.g., an archived message history, from a source computing platform to a destination computing platform. At the destination computing platform, the synch module may be further configured to convert the received archived message history to a specified data format, where the data format is predetermined by a user. The converted data, e.g., an archived message history, may then be stored in a pre-determined location by the synch module.

17 Claims, 12 Drawing Sheets

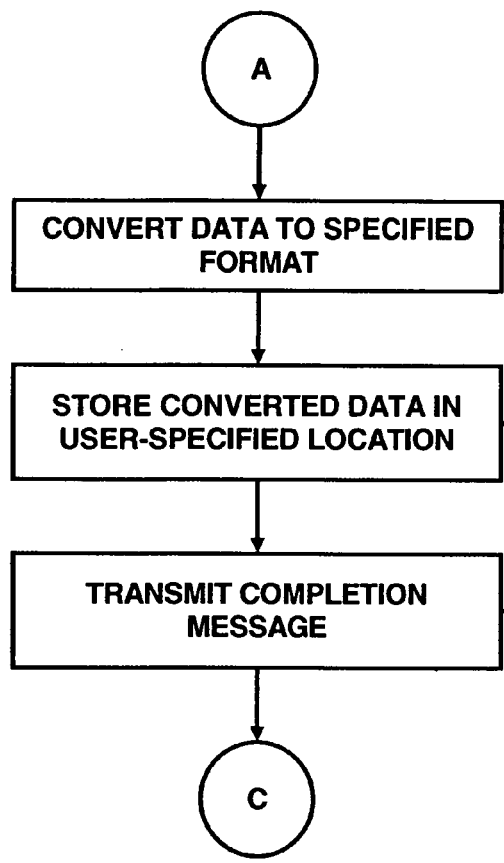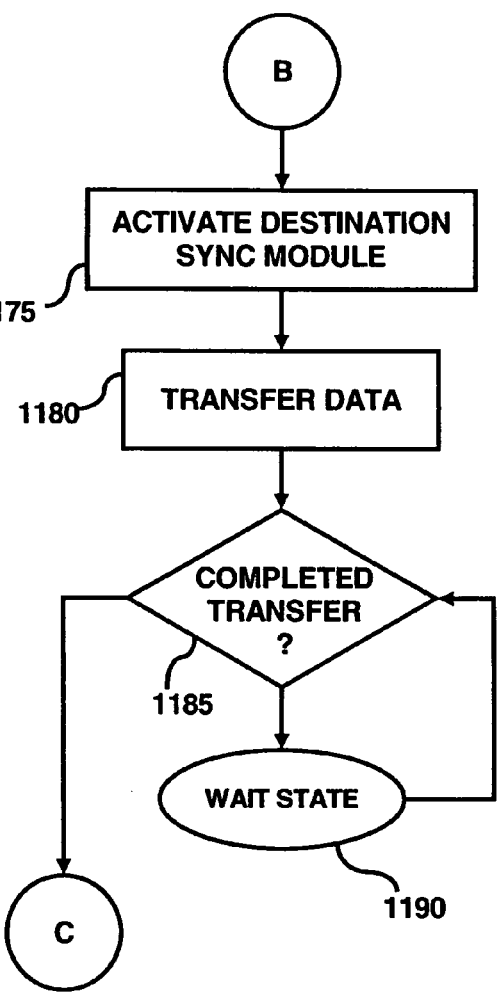
FIG. 11B
FIG. 11C

METHOD AND APPARATUS FOR STORING REAL-TIME TEXT MESSAGES

This application is a divisional of U.S. application Ser. No. 09/941,582, to LIBMAN, entitled "Method and Apparatus for Storing Real-Time Text Messages," filed on Aug. 30, 2001 now abandoned, the entirety of which is expressly incorporated herein by reference.

FIELD OF THE INVENTION

This invention relates generally to a system for transferring data, e.g., real-time text messages, between a source and destination computing platforms. More specifically, a synchronization module is utilized to both transfer and convert data, e.g., archived real-time text messages, from a format used by the source computing platform into a format suitable for use by the destination computing platform.

DESCRIPTION OF THE RELATED ART

Real time text messaging ("instant messaging") has gained widespread popularity. Instant messaging may be a valuable business tool because it allows users to communicate messages almost instantaneously to each other. Traditional computing platforms (e.g., personal computers, laptops, and the like) typically include a feature which enables a user to save instant messages (e.g., conversations, chat histories, etc.) in permanent memory of a computing system. Additionally, a user may be able to select a directory on a file system in permanent memory and/or a file format (e.g., ASCII, rich text, HTML, etc.) for saving the instant messages.

With the technological advances of wireless devices (e.g., hand held computers, web capable wireless telephones, etc.), the ability to perform instant messaging has been extended beyond the conventional computing platforms. In this respect, it is now possible for users to perform instant messaging from virtually anywhere by employing any number of wireless devices.

While instant messaging with wireless devices is convenient, wireless devices are not quite as convenient as the conventional computing platforms. For instance, the capability of conventional computing platforms to archive instant messages may be limited due to the relatively small amounts of memory typically found in conventional wireless devices. Accordingly, the relatively small amount of memory available on wireless devices may somewhat limit the number and length of instant messages that may be archived in the memory of the wireless devices. Additionally, because the wireless devices typically archive the instant messages under relatively unique formats, inter-device compatibility and availability may be limited.

SUMMARY OF THE INVENTION

According to one aspect, the present invention relates to a method for transferring data between a data source and a data sink. The method includes initiating a transfer of a message history data and transferring the message history data in response to an establishment of a communication channel. The method further includes converting received message history data to a previously selected data format and storing converted message history data in a previously selected location.

In another aspect, the present invention relates to a method for transferring chat history. The method includes initiating a transfer of the chat history and transferring the chat data in response to an establishment of a communication channel. The method further includes combining associated data related to the chat history and determining a destination of the chat history.

In yet another aspect, the present invention relates to a method for synchronizing a message history. The method includes initiating a transfer of the message history and transferring the message history in response to an establishment of a communication channel. The method includes determining a destination of the message history.

In yet another aspect, the present invention relates to an apparatus for synchronizing a chat history. The apparatus includes an interface adapted to communicate with a destination device and a memory configured to store the chat history of a messaging program. The apparatus also includes a processor configured to accept a synchronization request, and to transfer the chat history in response to an establishment of a communication channel through the interface.

In yet another aspect, the invention relates to a source device for synchronizing a message history. The source device includes the message history of a messaging program. The source device also includes a processor configured to accept a synchronization request, and to transfer the message history in response to an establishment of a communication channel through the interface.

In yet another aspect, the invention relates to a destination device for synchronizing a message history. The destination device includes an interface adapted to communicate with a source device and a memory. The destination device also includes a processor configured to establish a communication channel with the source device through the interface in response to a synchronization request at the source device and to activate a synchronization module configured to accept the message history from the source device in response to an activation message from the source device.

In yet another aspect, the invention relates to a system for synchronizing a chat history. The system includes a communication network, a source device configured to transfer the chat history over the communication network and a destination device configured to receive the chat history. The system also includes a source synchronization module executing on the source device and a destination synchronization module adapted to execute on the destination device, where the source synchronization module is configured to transfer the chat history in response to an activation of the destination synchronization module by the source synchronization module.

In yet another aspect, the invention relates to a computer readable storage medium on which is embedded one or more computer programs. The one or more computer programs implement a method of transferring a message history data, where the one or more computer programs include a set of instructions for initiating a transfer of the chat history and transferring the chat data in response to an establishment of a communication channel. The one or more computer programs also include a set of instructions for combining associated data related to the chat data and determining a destination of the chat data.

In yet another aspect, the invention relates to a computer readable storage medium on which is embedded one or more computer programs. The one or more computer programs implement a method of transferring a chat history, where the one or more computer programs include a set of instructions for transferring the chat history in response to an establishment of a communication channel with the destination and converting received data to a previously selected data format, and storing converted chat history in a previously selected location.

In yet another aspect, the invention relates to a computer readable storage medium on which is embedded one or more computer programs. The one or more computer programs implement a method of synchronizing a message history, where the one or more computer programs include a set of instructions for initiating a transfer of the message history, transferring the message history in response to an establishment of a communication channel, and determining a destination of the message history.

BRIEF DESCRIPTION OF THE DRAWINGS

Features and advantages of the present invention will become apparent to those skilled in the art from the following description with reference to the drawings, in which:

FIGS. 11A-C, together, illustrates an exemplary flow diagram for a destination/intermediate synchronization module in the system architecture as shown in FIGS. 8-9.

DETAILED DESCRIPTION OF THE INVENTION

Figure 1:
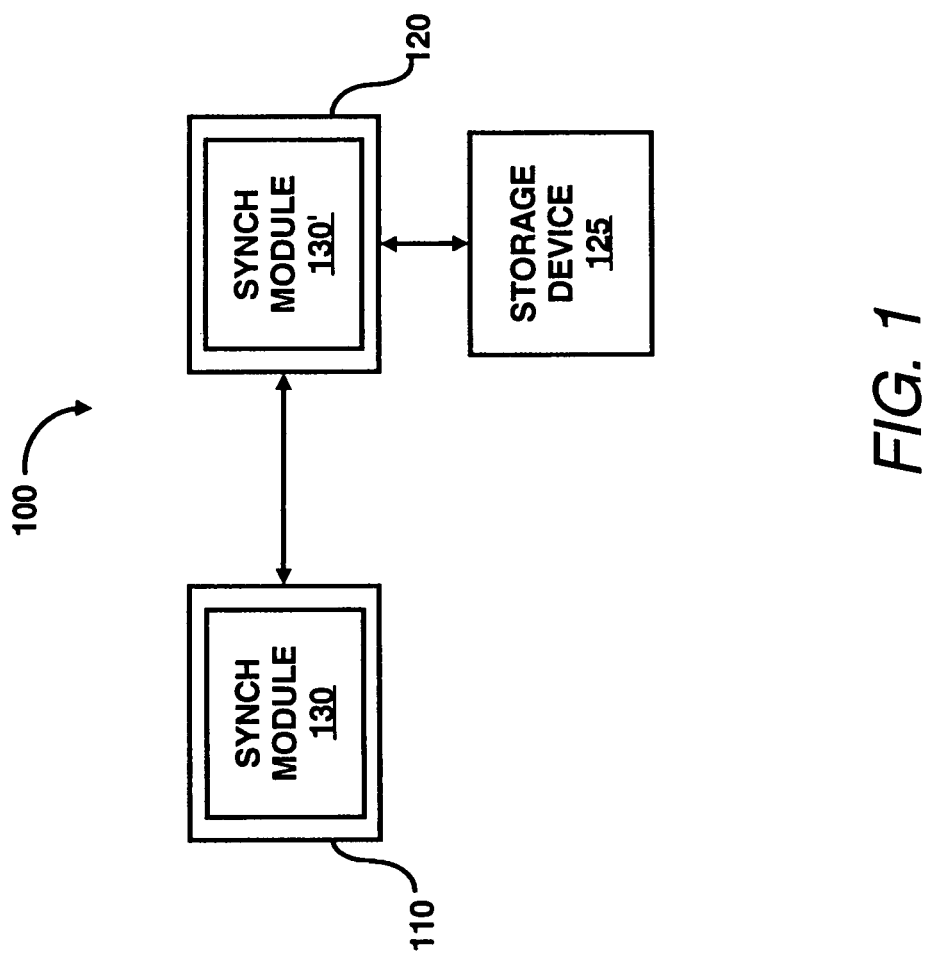
FIG. 1 illustrates an exemplary block diagram of a system architecture according to the principles of the present invention.

For simplicity and illustrative purposes, the principles of the present invention are described by referring mainly to exemplary embodiments thereof, particularly with references to a synchronization module ("synch module"). However, one of ordinary skill in the art would readily recognize that the same principles are equally applicable to, and can be implemented in, any type of computing environment capable of transferring data, and that any such variation would be within such modifications that do not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a synch module may reside on a source computing platform and a destination computing platform. The source computing platform may be one of the group comprising a wireless device (e.g., a text-messaging enabled pager, a personal digital assistant, a wireless telephone, etc.), a laptop computer, a desktop computer, or other similar computing platform. The destination computing platform may be selected from the same group of devices listed hereinabove for the source computing platform. However, the destination computing platform is not required to be identical to the source computing platform.

The synch module may be configured to operate as a source synch module or a destination synch module depending on which computing platform functions as a data source. As a data source or initiator, the synch module may be configured to transfer data, e.g., an archived message history, from a source computing platform to a destination computing platform. At the destination computing platform, the synch module may be further configured to convert the received archived message history to a specified data format, where the data format is predetermined by a user. The converted data, e.g., an archived message history, may then be stored in a pre-determined location by the synch module.

In particular, the synch module, functioning as an initiator (or source) of data on a source computing platform, may be configured to query for the availability of a destination computing platform. The synch module may be further configured to transfer data, e.g., an archived message history, in response to an establishment of a communication channel between the source computing platform and the destination computing platform. The communication may be implemented using conventional means such as wired (e.g., cable, modem, network, etc.) or wireless (e.g., infrared, optical, radio-frequency, etc.,) forms of communication. The synch module may be further configured to store the transferred data, e.g., an archived message history, to a destination synchronization module of the destination computing platform.

The synch module on the destination computing platform, functioning as a destination (or data sink), may be configured to convert the received data into a format specified by a user. The synch module may be configured to provide the capability to select a preferred or user-specified data format (e.g., text, HTML, PDF, etc.,) via a user-interface such as a menu option, a command line prompt, an icon, etc. The synch module may be further configured to store the converted data in a location also specified by the user via a user interface such as a dialog box, a command line prompt, an icon, etc.

In another aspect of the present invention, a synch module may reside on a source computing platform, an intermediate computing platform and a destination computing platform. Although the synch module is substantially similar on each computing platform, the synch module may function as a source synch module, an intermediate synch module or a destination synch module depending on the role of the respective computing platform. In particular, the synch module residing on the source computing platform may function as a source synch module. The synch module residing on the intermediate computing platform may function as an intermediate synch module. The synch module residing on the destination computing platform may function as the destination synch module.

In the source synch module aspect, the synch module may be configured to receive a synchronization request from a user. The synchronization request, broadly speaking, may be configured to initiate a data transfer and conversion from one computing platform to another computing platform. The synch module may be further configured to establish a communication channel with an intermediate or destination computing platform. Once the communication channel is established, the synch module may be further configured to activate the synch module of the intermediate/destination computing platform. The synch module may be further configured to transfer data, e.g., an archived message history, to the intermediate/destination computing platform. The synch module of the intermediate/destination computing platform may be configured to combine any data related to the transferred data into a single file.

In the intermediate synch module aspect, the synch module of the intermediate/destination computing platform may be further configured to determine if the intermediate computing platform is the final destination of the data from the source computing platform. If the intermediate computing platform is the final destination, the synch module may be configured to convert the transferred data into a data format specified by the user. The synch module of the intermediate computing platform may be further configured to send a completion signal or message to inform to the synch module of the source computing platform that the synchronization has been completed. Otherwise, the synch module of the intermediate computing platform may be further configured to determine whether the destination computing platform is available.

If the destination computing platform is unavailable, the synch module of the intermediate computing platform may temporarily store the transferred data while periodically attempting to establish a communication channel with the destination computing platform. Otherwise, the synch module may be further configured to establish a communication channel with the destination computing platform. The synch module may be further configured to activate the synch module of the destination computing platform in response to the establishment of a communication channel between the intermediate and destination computing platforms. The synch module of the intermediate computing platform may be further configured to transfer the designated data to the destination computing platform.

In the destination synchronization module aspect, the synch module of the destination computing platform may be configured to convert the received data into a data format selected by a user. The synch module may be further configured to store the converted data into a location also specified by the user.

FIG. 1 illustrates an exemplary block diagram of a system architecture 100 according to the principles of the present invention. As shown in FIG. 1, a source computing platform 110 may be interfaced with a destination computer platform 120. The source computing platform 110 may be a wireless device, e.g., a text-messaging pager, a wireless telephone, a personal digital assistant, etc., or a wired device such as a laptop computer, a computer, a server with clients, etc.

The destination computer platform 120 may be configured to provide a computing platform for applications and input/output services such as printing, information storage, etc. The destination computer platform 120 may be a wireless device, e.g., a text-messaging pager, a wireless telephone, a personal digital assistant, etc., or a wired device such as a laptop computer, a computer, a server with clients, etc.

The destination computer platform 120 may be further configured to interface with a data storage device 125. The data storage device 125 may be configured to provide additional storage for information for the computer system 120. The data storage device 125 may be implemented by a disk drive, tape drive, or other type of permanent memory.

The source computing platform 110 may be configured to communicate with the destination computing platform 120 via wired and/or wireless methods. The wired methods may include a cable, a modem connection through the public switched telephone network, etc. The wireless method may include infrared, Bluetooth, radio frequency, etc. The source computing platform 110 and the destination computing platform 120 may communicate using a communication protocol such as Bluetooth, IEEE 802.3, REFLEX, etc.

The source and destination computing platforms, 110 and 120, may be configured to provide the capability of a messaging service such as instant messaging for their respective users. Accordingly, a user of the source computing platform 110 and/or destination computing platform 120 may use a supporting network of the source computing platform 110 to transmit and/or receive instant messages from other users. The other users may use a complementary device to the source computing platform 110 and/or destination computing platform 120 (e.g., PDAs, laptop computers, desktop computers, etc.,) to communicate. The messaging service (not shown) may be implemented as a software program executed by the source computing platform 110 and/or destination computing platform 120. The messaging service may be further configured to maintain a history of the messages, i.e., a log of messages, passed between the user and other users. The message history may be stored as text file, compressed data file, or in any format suitable for the source computing platform and/or destination computing platform 120.

The source computing platform 110 and destination computing platform 120 may be configured to execute a first and second synch module 130 and 130', respectively. First synch module 130 and second synch module 130' are substantially similar, and may be identical. The functionality exhibited by each synch module, 130 or 130', as a source synch module or a destination synch module is dependent on which computing platform is the source of the data transmission.

For example, if the source computing platform 110 is configured to the source of the data to be transferred and synchronized with the destination computing platform 120, the first synch module 130 of the source computing platform 110 may be configured to receive a synchronization request from a user. The first synch module 130 may be further configured to transfer data, e.g., a message history, to the second synch module 130' of the destination computing platform 120 over a communication channel. Although, for illustrative purposes only, FIG. 1 shows the source computing platform 110 as the source of data, it should be computing platforms, 110 and 120, respectively, may be the source of data. Accordingly, a user initiates a synch command from the destination computing platform, the destination synch module attempts to establish the connection with the source synch module and "pulls" the message history from the source computing platform.

The second synch module 130' of the destination computing platform 120 may be configured to convert the received data into a predetermined data format by the user. The second synch module 130' may be further configured to store the converted message history in a predetermined location.

Conversely, if the second synch module 130' receives a synchronization request, the second synch module 130' may be configured to transfer data, e.g., a message history, to the first synch module 130 over a communication channel. The first synch module 130 may be configured to configured to convert the received data into a data format predetermined by the user. The first synch module 130 may be further configured to store the converted message history in a predetermined location.

Figure 2:
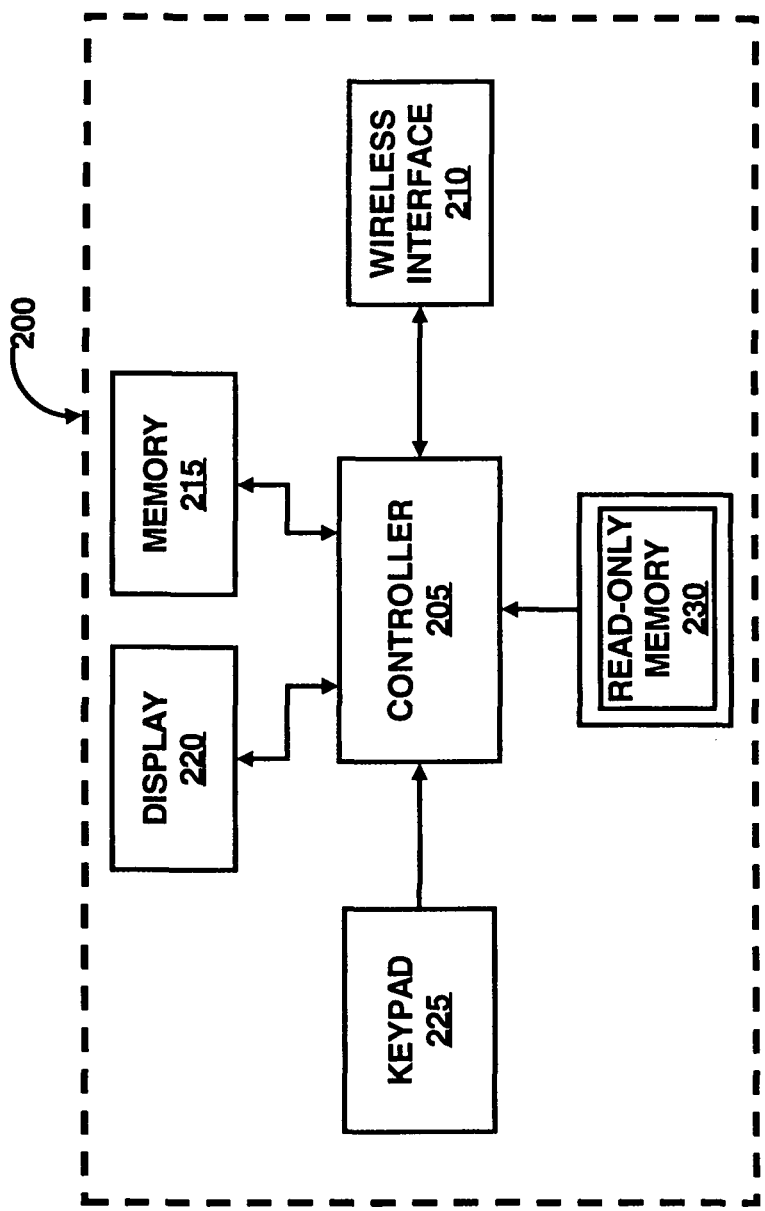
FIG. 2 illustrates an exemplary block diagram of a wireless device as a source computing platform shown in FIG. 1 in accordance with the principles of the present invention.

FIG. 2 illustrates an exemplary block diagram of a wireless device 200 as the source computing platform 110 shown in FIG. 1 in accordance with the principles of the present invention. As shown in FIG. 2, the wireless device 200 may include a controller 205, a wireless interface 210, a memory 215, a display 220, a keypad 225, and a read-only memory 230. Although, for illustrative purposes only, FIG. 2 illustrates the wireless device 200 with the above-mentioned components, it should be readily apparent to those of ordinary skill in the art that FIG. 2 represents a generalized schematic illustration of a wireless device and that other components may be added or existing components may be subtracted without departing from the spirit or scope of the present invention.

The controller 205 may be configured to provide a computing platform for the software/firmware that provides the functionality of the wireless device 200 and to execute a computer program embodiment of the synch module 130. The controller 205 may be implemented with a microprocessor, a micro-controller, an application specific integrated circuit ("ASIC") a digital signal processor, and the like.

The controller 205 may be interfaced with a wireless interface 210. The wireless interface 210 may be configured to provide the capability for the user to receive and transmit information via radio frequency techniques such as cellular networks, pager networks, etc. The wireless interface 210 may be implemented by a pager interface, a wireless modem, a personal communication services ("PCS") interface, and the like.

The controller 205 may be further configured to interface with the memory 215. The memory 215 may be configured to provide the capability to store information and to provide application memory space. The memory 215 may be implemented with a random access memory ("RAM"), flash memory, or other re-writable memory.

The display 220 may be configured to interface with the controller 205. The display 220 may be further configured to provide an interface for information to be displayed, including messages. The display 220 may include menu icons, program icons, or similar user interfaces to enable navigation through the functionality of the wireless device 200. The display 220 may be implemented with a liquid crystal display, thin film target display, or the like.

The controller 205 may be configured to interface with the keypad 225 which is configured to provide an interface for the performance of predetermined functions of the wireless device 200. The keypad 225 may be implemented by a numeric keypad, an alphanumeric keypad, or the like.

The read-only memory 230 of the wireless device 200 may be configured to provide non-volatile storage of software for the wireless device 200. The software may include an operating system, operational software that provides the functionality of the wireless device 200, third party software, and the like. The read-only memory 230 may be implemented with an EEPROM, a PROM, a flash memory, or other types of permanent memories.

Figure 3:
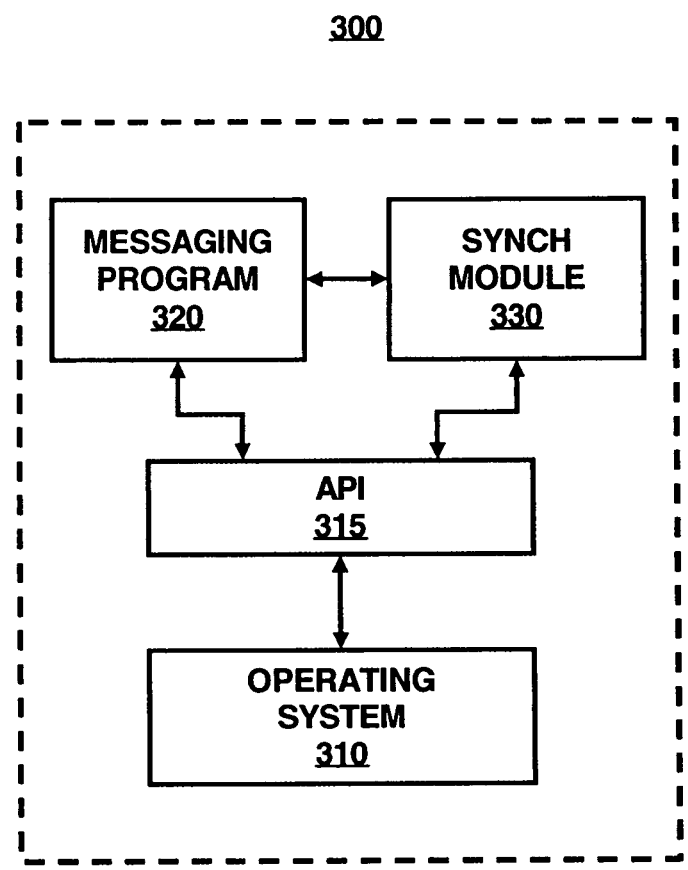
FIG. 3. illustrates an exemplary block diagram of a software architecture for the wireless device shown in FIG. 2 in accordance with the principles of the present invention.

FIG. 3. illustrates an exemplary block diagram of a software architecture 300 for the wireless device 200 shown in FIG. 2 in accordance with the principles of the present invention. As shown in FIG. 3, the software architecture 300 includes at least an operating system 310, an application program interface ("API") 315, a messaging program 320, and the synch module 130. Although, for illustrative purposes only, FIG. 3 illustrates the wireless device 200 with above-mentioned software architecture, it should be readily apparent to those of ordinary skill in the art that FIG. 3 represents a generalized illustration of the software architecture and that other software components may be added or existing software components may subtracted without departing from the spirit or scope of the present invention.

The operating system 310 of the wireless device 200 may be configured to manage software programs or applications that provide functionality to the wireless device 200. The operating system 310 may be further configured to provide an interface to the software applications and to the underlying hardware components, as shown in FIG. 2, of the wireless device 200 through the API 315.

The messaging program 320 may be configured to provide the wireless device 200 with the capability of receiving and transmitting instant messages between the user and other similarly-enabled users. The messaging program 320 may be configured to maintain a message history of conversations between the user and other similarly-enabled users. The message history may be stored on the memory 215 of the wireless device 200, shown in FIG. 2. The messaging program 320 may be further configured to save the message history as a text file, a compressed data file, or in a format configured to conserve space in the memory 215. Examples of a messaging program may include AETHER INSTANT MESSAGING, JABBER, etc.

The synch module 330 of the wireless device 200 may be configured to include the functionality of the first and second synch modules 130 or 130', respectively, as described herein above. Moreover, the synch module 330 may be configured to function an initiator of the transfer of data. Accordingly, the synch module 330 may be configured to transfer data, e.g., the saved or archived message history, from the memory 215 to a destination computer platform in response to a synchronization request. The synchronization request may be initiated, for example, as a menu option, an icon or manually initiated through the keypad 225. The synch module 330 may be further configured to determine whether a communication channel is available over the wireless interface 210 to a destination computer system. In the event that the synch module 330 is unable to open a communication channel to a destination computer platform, the synch module 330 may be further configured to indicate that the synchronization could not be performed. Alternatively, the synch module 330 of the source computing platform may be configured to receive data, e.g., a message history, from another computing platform, which is described in greater detail herein below.

Figure 4:
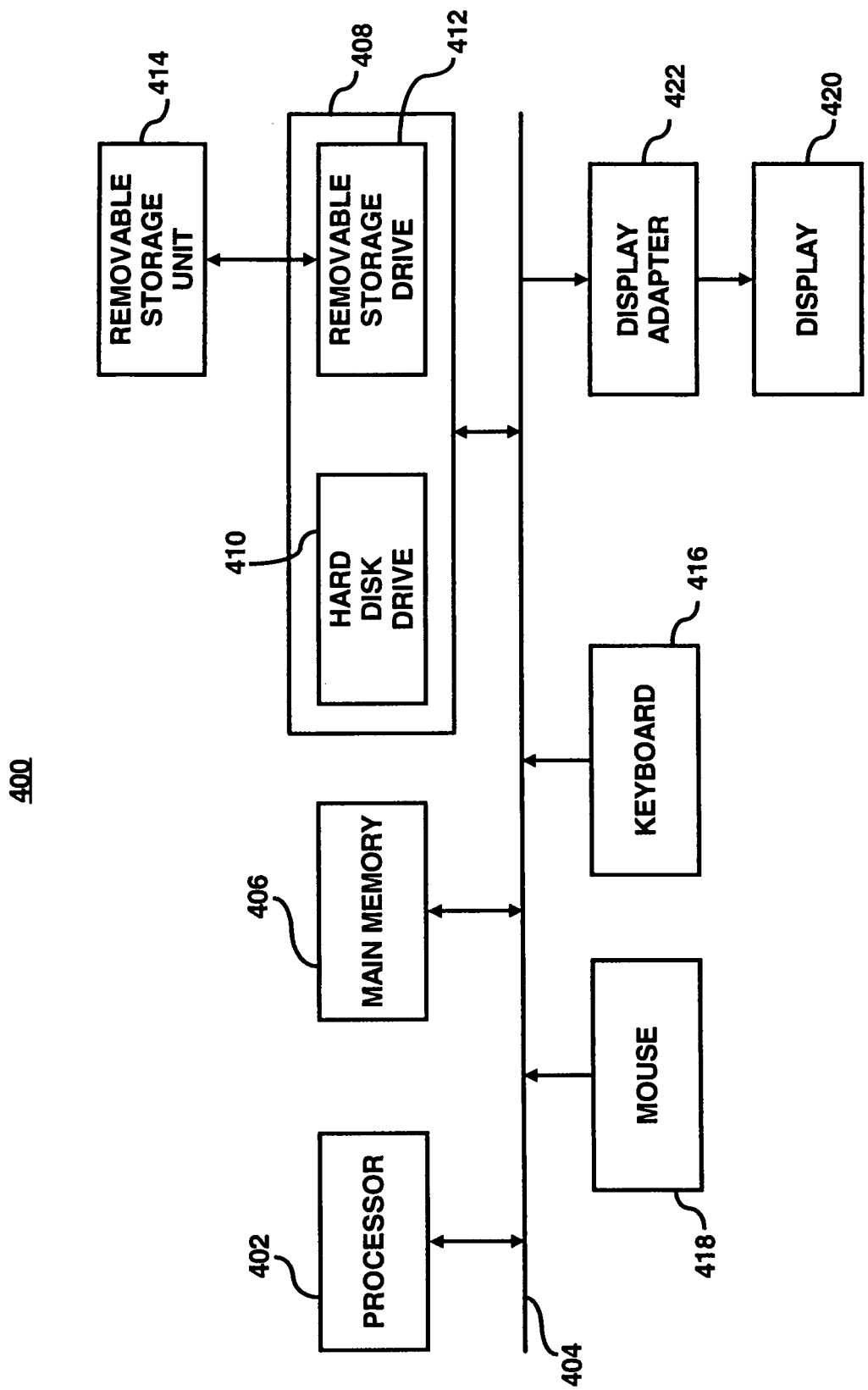
FIG. 4 illustrates an exemplary block diagram of a computer system as the destination computing platform, as shown in FIG. 1, in accordance with the principles of the present invention.

FIG. 4 illustrates an exemplary block diagram of a computer system 400 as the destination computing platform 120 and executing a computer program embodiment of the synch module, 130 or 130', as shown in FIG. 1, in accordance with the principles of the present invention. Moreover, the computer system 400 may be configured to function a destination for the transfer of data from wireless device 200.

The functions of the synch modules, 130 or 130', may be implemented in program code and executed by the computer system 400. In particular, the computer system 400 includes one or more processors, such as processor 402 that provides an execution platform for the destination synchronization module. Commands and data from the processor 402 are communicated over a communication bus 404. The computer system 400 also includes a main memory 406, preferably Random Access Memory (RAM), where the software for the destination synchronization module is executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of software for the synch modules, 130 or 130', may be stored. The removable storage drive 412 reads from and/or writes to a removable storage unit 414 in a well-known manner. The synch modules, 130 or 130', is interfaced with a keyboard 416, a mouse 418, and a display 420. The display adaptor 422 interfaces with the communication bus 404 to receive display data from the processor 402 and converts the display data into display commands for the display 420. A wireless interface (not shown) is configured to provide a communication interface between the destination computer platform 400 and a source computing platform.

Figure 5:
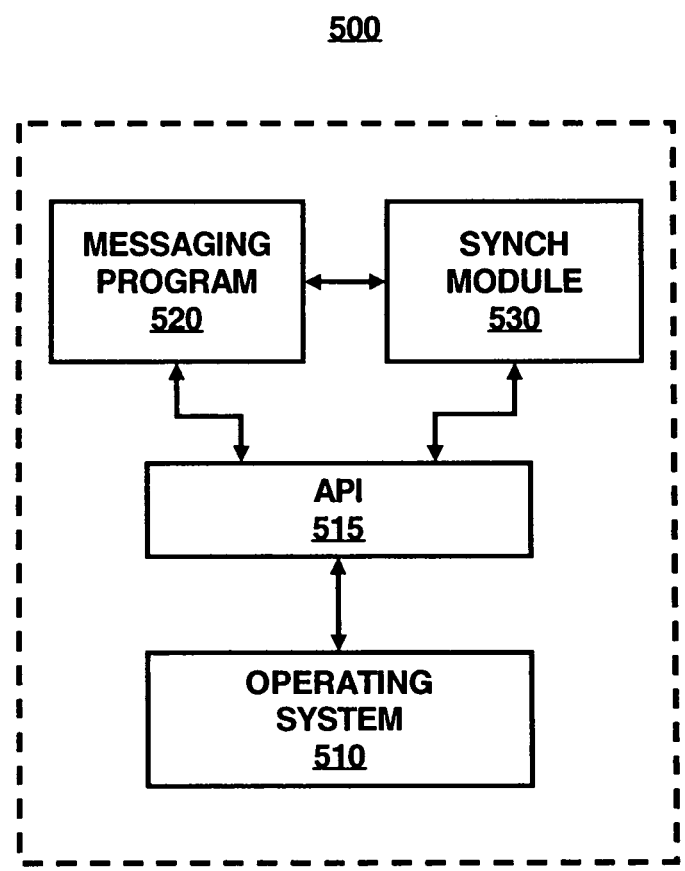
FIG. 5 illustrates an exemplary block diagram of a software architecture for the destination computer system, as shown in FIG. 4, in accordance with the principles of the present invention.

FIG. 5 illustrates an exemplary block diagram of a software architecture executed by the destination computer system 400, as shown in FIG. 4, in accordance with the principles of the present invention. As shown in FIG. 5, the software architecture 500 includes at least an operating system 510, an API 515, a messaging program 520, and a synch module 530. The synch module 530 may include all the functionality of the synch module, 130 or 130', as discussed herein above. It should be readily apparent to those of ordinary skill in the art that FIG. 5 represents a generalized view of the software architecture and that other software components may be added or existing software components may be subtracted without departing from the spirit or scope of the present invention.

The operating system 510 of the destination computer system 400 may be configured to manage software programs or applications that provide functionality to the destination computer system 400. The operating system 510 may be further configured to provide an interface through the API 515 to the software applications and to the underlying hardware components, shown in FIG. 2, of the wireless device 200.

The messaging program 520 may be configured to provide the destination computer system 400 with the capability of receiving and transmitting instant messages between the user and other similarly-enabled users. The messaging program 520 may be configured to maintain a message history of conversations between the user and other similarly-enabled users. The message history may be stored on the main memory 406 of the destination computer system 400, shown in FIG. 4. The messaging program 520 may be further configured to save the message history as a text file, a compressed data file or in a format configured to conserve space in the main memory 406. Examples of a messaging program may include AETHER INSTANT MESSAGING, JABBER, etc.

The synch module 530 of the destination computer system 400 may include the functionality of the synch module, 130 or 130', as discussed herein above. Moreover, the synch module 530 may be further configured to convert a transferred archived message history from a wireless device in response to a connection query. The connection query may be initiated by a synchronization module of a wireless device. The connection query may be configured to determine whether a communication channel is available between a wireless device and the destination computer system 400.

If the communication channel is available, the synch module 530 may be configured to receive an archived message history from a wireless device. The synch module 530 may be further configured to convert the format of the archived message history into a user-specified format. The synch module 530 may be further configured to provide a capability of selecting a data format (e.g., MICROSOFT WORD, HTML, XML, etc.,) for the converted archived message history. Moreover, the synch module 530 may be further configured to store the converted data, e.g., an archived message history, in a location specified by the user, e.g., the hard disk drive 410 of the destination computer system 400. Alternatively, the synch module 530 of the destination computing platform may be further configured to execute similar functionality as the synch module 330 of the source computing platform, as described herein above, when the synch module 530 is a source of data.

Figure 6:
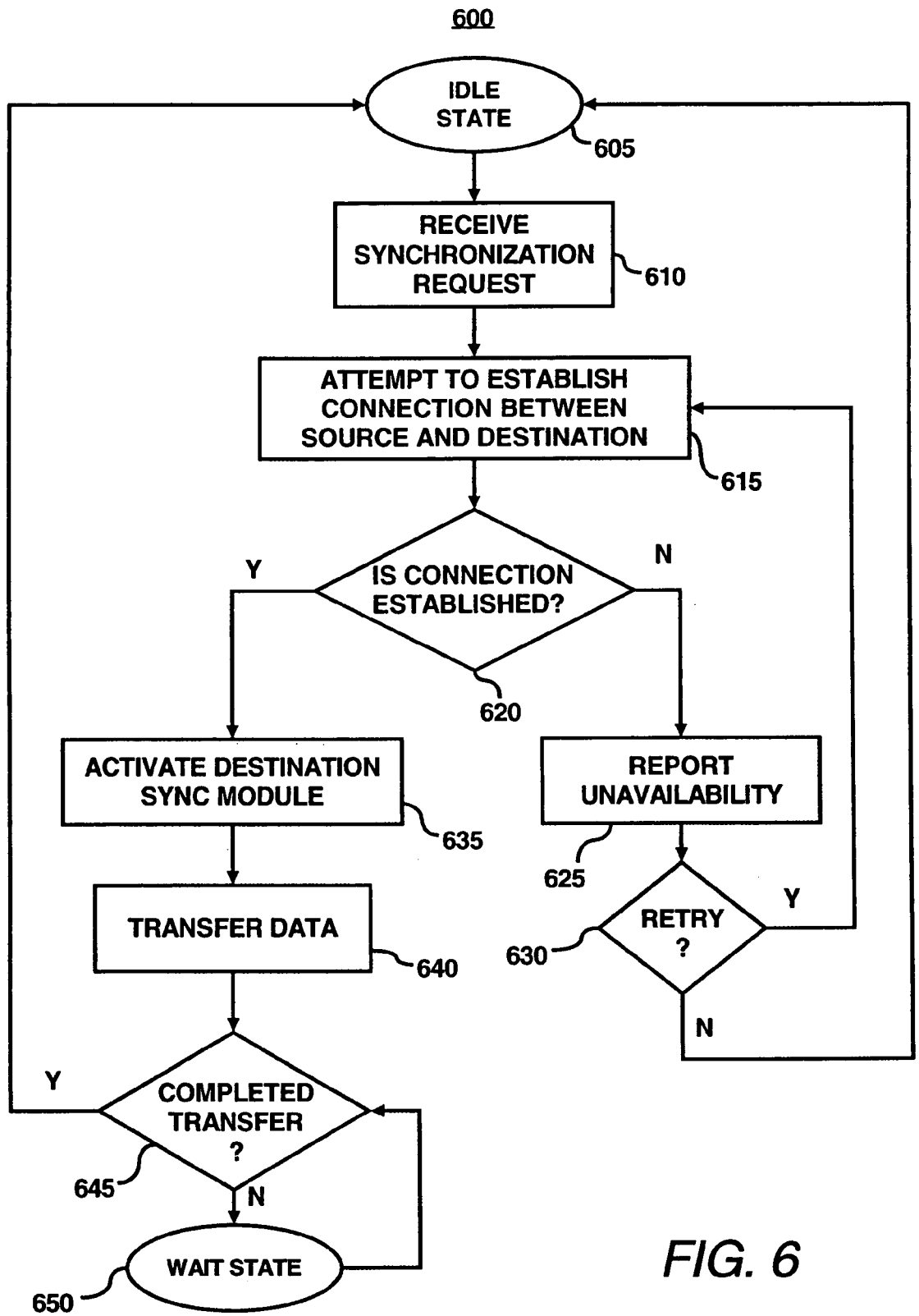
FIG. 6 illustrates an exemplary flow diagram of a synch module functioning as a source synch module for either of the synchronization modules as shown in FIGS. 3 and 5, respectively, in accordance with the principles of the present invention.

FIG. 6 illustrates an exemplary flow diagram 600 of the synch module 330 shown in FIG. 3 functioning as a source synchronization module in accordance with the principles of the present invention. The synch module 330 may be configured to be in an idle state or inactive state, in step 605. The synch module 330 may receive a synchronization request from a user, in step 610. For example, the synchronization request may have been initiated by a menu option displayed on the display 220 or a combination of keypresses on the keypad 225 for the wireless device 200.

In step 615, the synch module 330 of source destination computing platform, e.g., wireless device 200, may be configured to attempt to link or establish a connection or communication channel with a destination computer platform such as computer system 400, as shown in FIG. 4. The synch module 330 may link with the destination computer platform utilizing wired (e.g., RS-232, universal serial bus, etc.,) or wireless (e.g., infrared, radio frequency, Bluetooth, etc.,) protocols.

In step 620, the synch module 330 may be further configured to determine whether a connection has been established between the wireless device 200 and the destination computer platform. If the connection has not been established, the synch module 330 may be further configured to report that the destination computer system is unavailable to the user, in step 625. For example, the synch module 330 may display a text message on the display 220 informing the user that the destination computer system is unavailable. The synch module 330, in step 630, may be further configured to query the user whether the user would like to re-attempt to link with the destination computer via displaying a text message on the display 220. If the user decides to re-attempt to connect to the destination computer, for example, by pressing a combination of keypresses on the keypad 225, the synch module 330 may be further configured to return to step 615. Otherwise, the synch module 330 may be further configured to return to an idle state 605.

Returning to step 620, if the synch module 330 of the source computing platform is successful in connecting to the destination computer, the synch module 330 may be configured to send an activate message or signal to a destination synchronization module of the destination computer system, in step 635. The activate message may be configured to prepare the destination synchronization module for the receipt of data from the wireless device 200. The destination synchronization module may be configured to send an activated message response configured to inform the synch module 330 that the destination synchronization module has been activated.

In step 640, the synch module 330 of the wireless device 200 may be configured to transfer the archived message history to the destination synchronization module in response to receiving the activated message. The synch module 330 may be further configured to determined whether the data transfer is completed, in step 645. If the archived message history has been transferred, the synch module 330 may be further configured to return to the idle state 605. Otherwise, the synch module 330 may be further configured to enter a wait state, in step 650, and return to step 645 after the wait state has expired to determine if the data transfer has been completed. The length of the wait state may be a variable which may be set by the user, programmer, or manufacturer.

Figure 7:
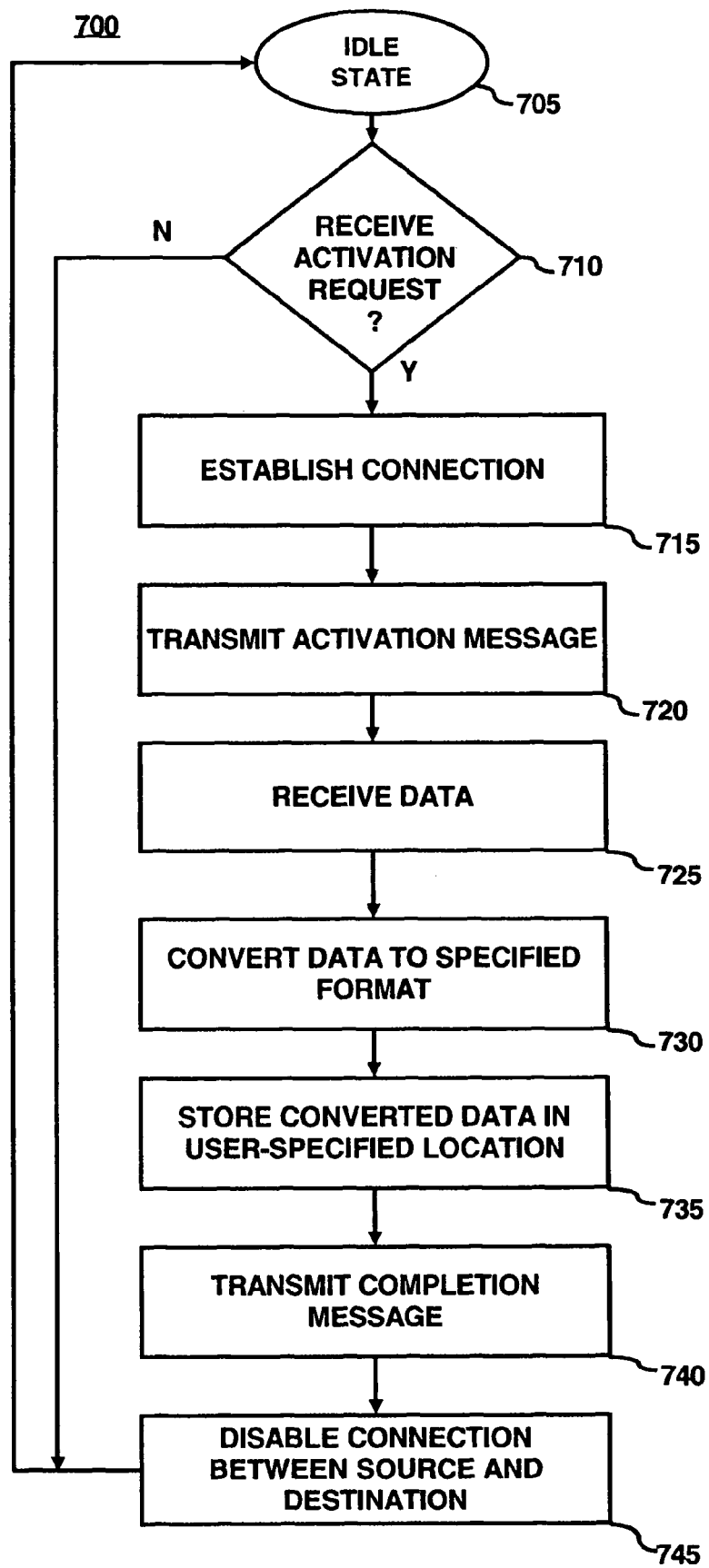
FIG. 7 illustrates an exemplary flow diagram of the destination synchronization module portion of the synchronization modules of FIGS. 3 and 5, respectively, in accordance with the principles of the present invention.

FIG. 7 illustrates an exemplary flow diagram 700 of the synch module 530 functioning as a destination synch module in accordance with the principles of the present invention. As shown in FIG. 7, the synch module 530 of the destination computer system 120 may be configured to be in an idle state, in step 705. The destination computer system 120 may receive messages or signals from remote devices while in the idle state.

In step 710, if one of the messages is an activation message from a source computing platform, e.g., a wireless device, the synch module 530 may be further configured to establish a connection in step 715 with the requesting device. Otherwise, the synch module 530 may be further configured to return to the idle state of step 705.

Once the connection has been established, the synch module 550 may be further configured to transmit an activation response signal or message, in step 720. The activation signal may be in the form of a protocol handshake, a message packet, and the like.

In step 725, the synch module 530 may be further configured to receive data, e.g., archived message history, from the source computing platform. The data is converted into a user-specified format in step 730. Alternatively, the synch module 530 may be configured to convert the received data after the source computing platform completes the transfer of the received data.

In step 735, the synch module 530 may be further configured store the converted data in a pre-determined location. The synch module 530 may be configured to previously provide a user interface, e.g., a menu option, a dialog box, a command line prompt, etc., whereby the user may specify a location to store the converted data.

In step 740, the synch module 530 may be further configured to transmit a synchronization completed signal or message to the source computing platform and the connection between the destination computer system 120 and a source device is severed or ended, in step 745. The synch module 530 may be further configured to return to the idle state of step 705.

Figure 8:
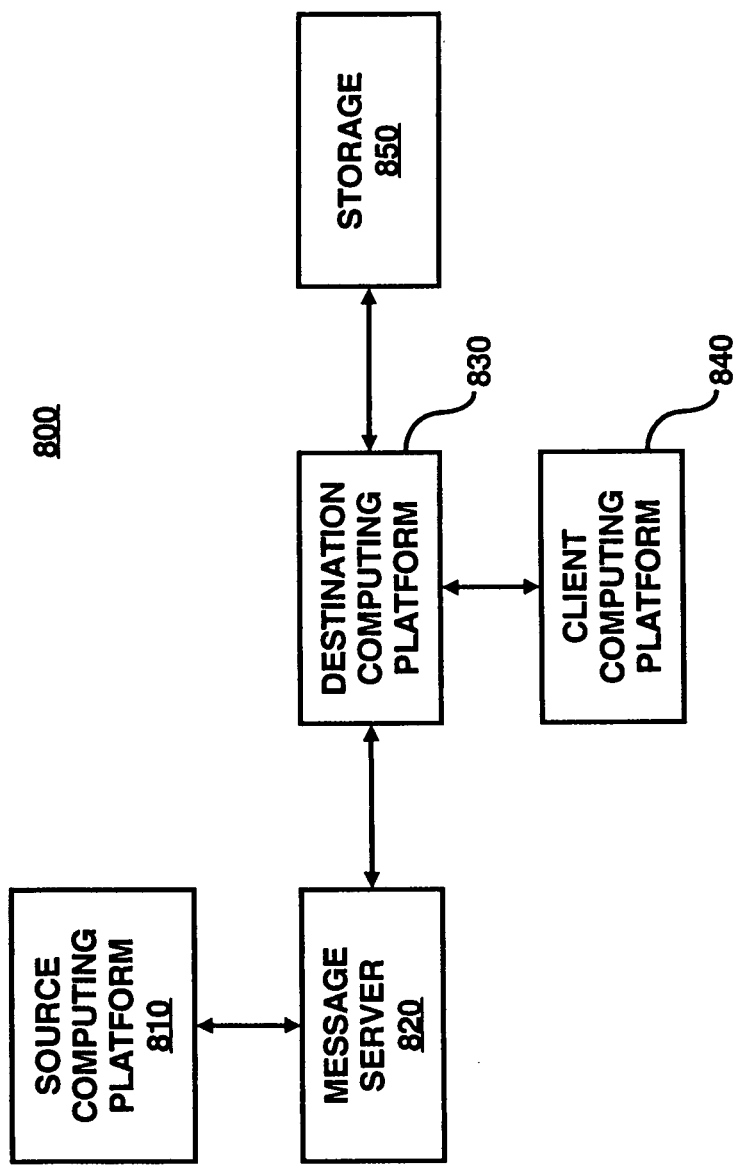
FIG. 8 illustrates an exemplary block diagram of a system architecture of another embodiment of the present invention.

FIG. 8 illustrates an exemplary block diagram of a system architecture 800 of another embodiment of the present invention. As shown in FIG. 8, the system architecture 800 includes a source computing platform 810, a message server 820 as an intermediate computing platform, a destination computing platform 830, a client computing platform 840, and a storage system 850. Although, for illustrative purposes only, FIG. 8 shows one source computing platform 810, one message server 820, one destination computing platform 830, and one client computing platform 840, it should be readily apparent to one of ordinary skill in the art that any number of devices may be used without departing from scope or spirit of the present invention.

The source computing platform 810 similar to the source computing platform device 110 shown in FIG. 1 described hereinabove and thus only those features which are reasonably necessary for a complete understanding of this embodiment is described herein below. The message server 820 may be configured to provide a messaging service, e.g., AETHER INSTANT MESSAGING, JABBER, etc., to users. The message server 820 may be implemented using computing platforms such as SUN ENTERPRISE 10000 SERVER, SILICON GRAPHICS INCORPORATED 2100, HEWLETT PACKARD 9000, etc. The message server 820 may be configured to interface with computing platforms such as wireless devices through a wireless networks such as personal communication services network, a pager network, a cellular telephone network, etc., or a combination thereof.

The message server 820 may be further configured to provide an archiving or storage service to source computing platforms, e.g., wireless devices such as text pagers, WAP-enabled telephones, etc., that are not equipped with sufficient memory to store data, e.g., an archived message history. For example, a text pager as the source computing platform 810 may not contain enough memory to maintain a message history for a messaging session between users. As a result, the message server 820 may be configured to provide memory space to temporarily store data, e.g., the message history.

The message server 820 may be further configured to interface to the destination computing platform 830 via wired (e.g., local area networks, wide area networks, etc.,) means or wireless networks. The destination computing platform 830 is substantially similar to the destination computing platform 120 as shown in FIG. 1, and thus only those features which are reasonably necessary for a complete understanding of this embodiment is described herein below. The destination computing platform 830 may be configured to provide an archiving or storage service for users of the source computing platform 810. The destination computing platform 830 may be configured to convert received data, e.g., a message history, into a user-specified format and store the converted data in a pre-determined user location in the storage device 850 interfaced with the destination computing platform 830.

Figure 9:
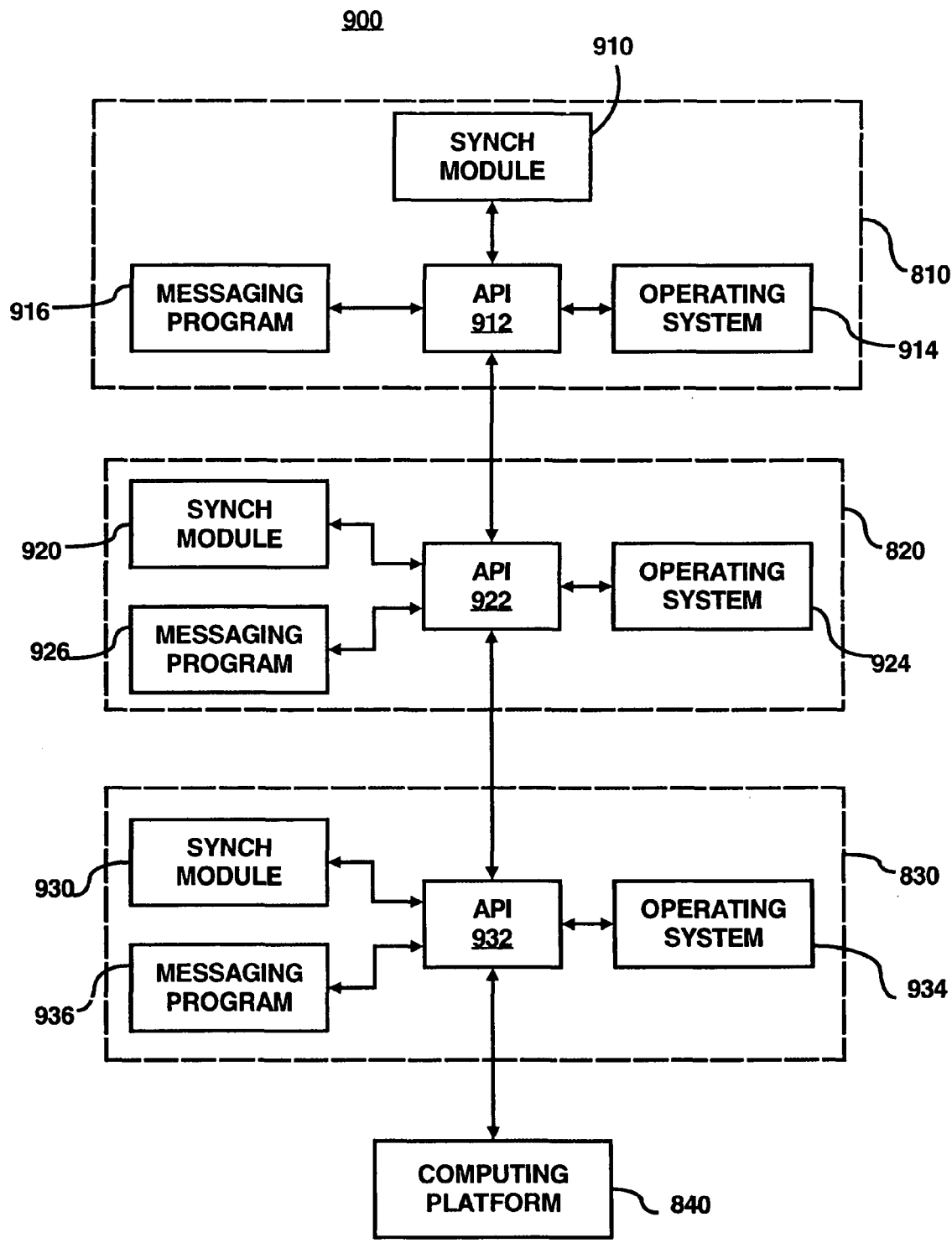
FIG. 9 illustrates an exemplary block diagram of a software architecture of an embodiment of the present invention as implemented in the system architecture of FIG. 8.

FIG. 9 illustrates an exemplary block diagram of a software architecture 900 of an embodiment of the present invention as implemented in the system architecture of FIG. 8. As shown in FIG. 9, the source computing platform 810, message server 820 and the destination computing platform 830 each contain a respective synch module, 910,920,930. Each of the synch modules 910,920,930 may be configured to include similar functionality as the synch module, 130 or 130'. Accordingly, each synch module may have the functionality of a source and/or destination synch module depending on which computing platform is the source/destination of data as discussed hereinabove with respect to FIGS. 1-7. Moreover, each synch module, 910,920,930, may include an intermediate synch module functionality. With regard to the intermediate synch module aspect, the synch module, 910,920,930, may be configured to provide interim processing of data from a source computing platform to a destination computing platform.

In particular, an intermediate computing platform may contain data related to a synchronization request. The sync module of the intermediate computing platform may be configured to combine any data related to the synchronization request into a single file on an intermediate computing platform.

The synch module of the intermediate computing platform may be further configured to determine if the intermediate computing platform is the final destination of the data from the source computing platform. If the intermediate computing platform is the final destination, the synch module may be configured to convert the transferred data into a data format specified by the user. The synch module may be further configured to send a completion signal or message to inform a source computing platform that the synchronization request has been completed. Otherwise, the synch module may be further configured to determine whether the destination computing platform is available.

If the destination computing platform is unavailable, the synch module of the intermediate computing platform may temporarily store the transferred data while periodically attempting to establish a communication channel with the destination computing platform. Otherwise, the synch module may be further configured to establish a communication channel with the destination computing platform. The synch module may be further configured to activate a synch module of the destination computing platform in response to the establishment of a communication channel between the intermediate and destination computing platforms. The synch module of the intermediate computing platform may be further configured to transfer the designated data to the destination computing platform.

As an example of an embodiment of the present invention, if the source computing platform 810 is configured as a source of data, the synch module 910, functioning as a source synchronization module, may be configured to transfer the saved or archived message history from a messaging program 916 in the source computing platform 810 to a destination computer system in response to a synchronization request. The synchronization request may be initiated as a menu option, an icon or manually initiated through a keypad on the source computing platform 810.

The synch module 910 of the source computing platform 810 may be further configured to determine whether a communication channel is available over an interface (wired/wireless) to an intermediate/destination computer system through an API 912 of an operating system 914. In the event that the synch module 910 is unable to open a communication channel to the intermediate/destination computer system, the synch module 910 may be further configured to indicate that the synchronization could not be performed.

If the communication channel is available, the synch module 920 of the intermediate computing platform, such as the message server 820, may be interfaced through an API 922 of an operating system 924. The API 922 may be further configured to interface with a messaging program 926. The messaging program 926 may be configured to provide instant messaging services for users of the system architecture 800. The messaging program 926 may be implemented by AETHER INTELLIGENT MESSAGING, JABBER, etc.

The synch module 920 of the message server 820 may be further configured to receive data, e.g., a message history, from the source computing platform 810. The synch module 920 may be further configured to combine any data related to the received data and to determine whether the message server 820 is the destination for the data. If the message server 820 is final destination for the data, the synch module 920 may be further configured to store the data in predetermined location.

Otherwise, the synch module 920 may be further configured to establish a connection with the destination computing platform 830 through an API 932 of an operating system 934. The API 932 may be further configured to interface with a messaging program 936. If the connection is not enabled, the synch module 920 may temporarily store the combined data in memory location and attempt to establish a connection with the destination computing platform 830 at a later time. Otherwise, once the connection is established, the synch module 920 of the message server 820 may be configured to transfer the combined data to the destination computing platform 830.

The synch module 930 of the destination computing platform 830 may be configured to convert received data, e.g., a message history, to a user-specified format. The synch module 930 may be further configured to store the converted data in a location specified by the user in the storage device 850. Alternatively, the converted data may be stored in a memory of a computer system 840 by the destination synch module 930.

Figure 10:
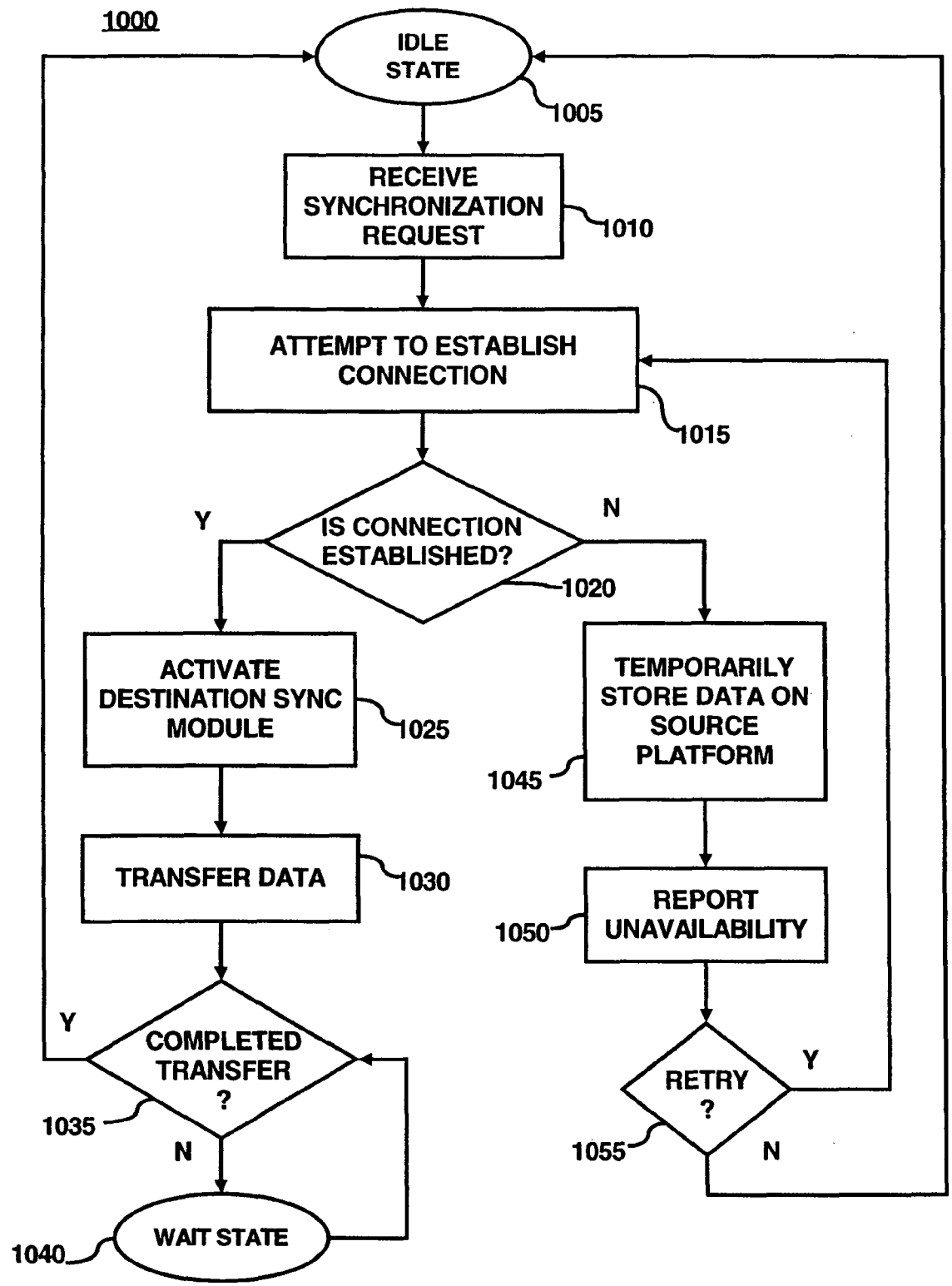
FIG. 10 illustrates an exemplary flow diagram for a source synchronization module in the system architecture as shown in FIGS. 8-9.

FIG. 10 illustrates an exemplary flow diagram 1000 for a source synchronization module in the system architecture as shown in FIGS. 8-9. As shown in FIG. 10, a source synchronization module may be configured to be in an idle state, in step 1005. In step 1010, a synchronization may be initiated by receipt of a synchronization request. The synchronization request may be initiated by a menu option, a command line prompt, a combination of keypresses, etc.

Once the synchronization is initiated, the source synchronization module may be further configured to establish a connection in step 1015. The source synchronization module may initiate a connection protocol or transmit a message to connect with a destination synchronization module. If the connection is not enabled, the source synchronization module may be further configured to store the data, e.g., a message history, on the source platform such as a wireless device, a computing platform, etc.

Otherwise, when the connection is established in step 1020, the source synchronization module may be further configured to activate a destination synchronization module, in step 1025. The destination synchronization module may be activated as part of a protocol handshake, receiving an activation signal or message, etc.

In step 1030, the source synchronization module may be further configured to transfer data, e.g., a message history, in response to the activation of the destination synchronization module. In step 1035, the source synchronization module may be further configured to determine if the data transfer is completed. If the data transfer is not completed, the source synchronization module may be further configured to enter a wait state, in step 1040.

Returning to step 1035, if the data transfer is complete, the source synchronization module may be configured to return to the idle state of step 1005.

Returning to step 1020, if the connection cannot be established, the source synchronization module may be further configured to temporarily store the data, e.g., a chat history, on the source computing platform, in step 1045. The source synchronization module, in step 1050 may be further configured to report the unavailability of the destination computing platform.

In step 1055, the source synchronization module may be further configured to prompt a user for a re-attempt to establish communication with the destination computing platform. If the there is a re-attempt, the source synchronization module may be configured to return to step 1015. Otherwise, the source synchronization module may be configured to return to the idle state of step 1005.

Figure 11A:
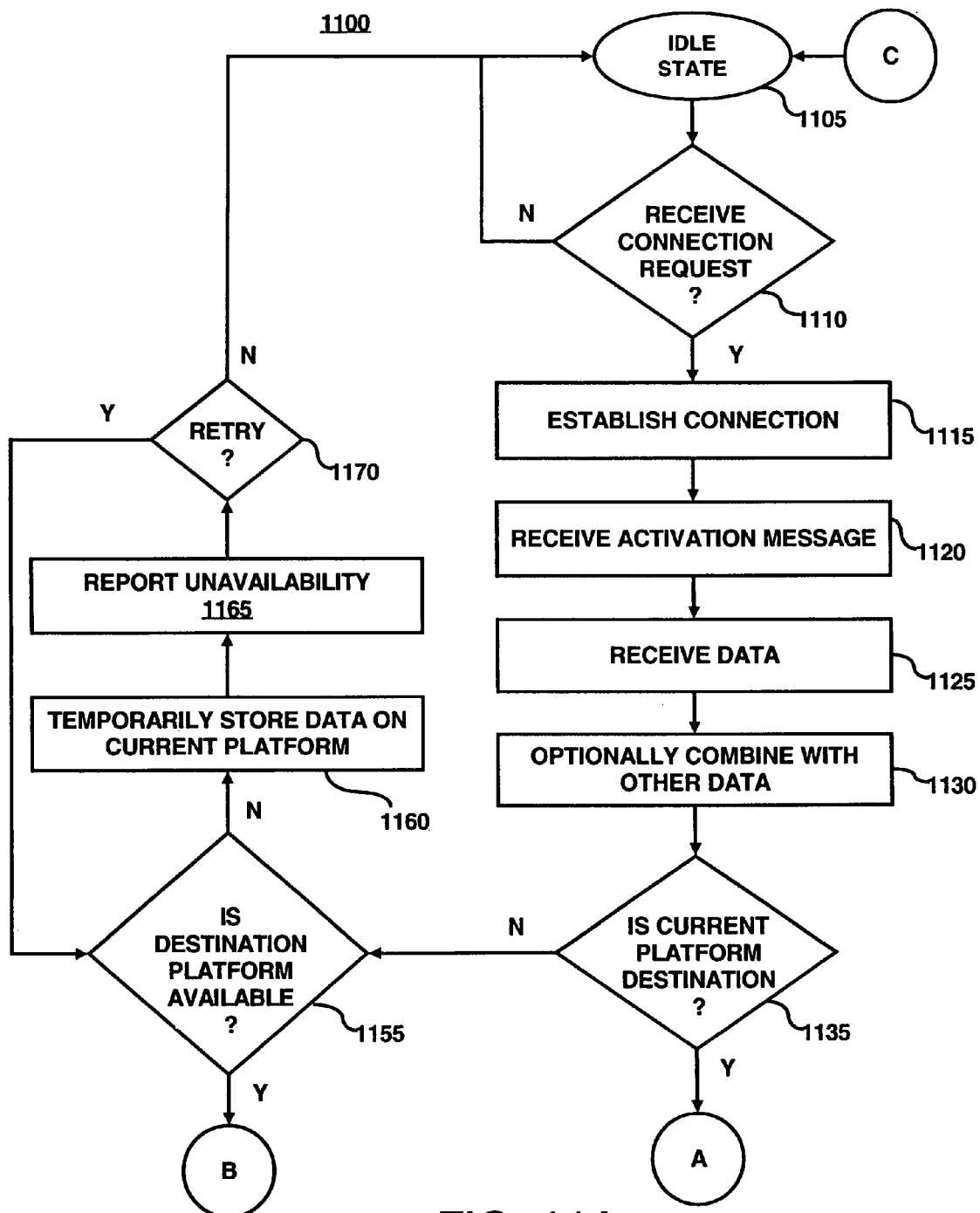

FIGS. 11A-C, together, illustrate an exemplary flow diagram 1100 for a destination/intermediate synchronization module in the system architecture as shown in FIGS. 8-9. As shown in FIG. 11A, the destination/intermediate synchronization module ("DISM") may be configured to be in an idle state in step 1105. The DISM may be further configured to determine whether a connection request has been received from a source synchronization module, in step 1110. This determination may be implemented asynchronously or on a periodic basis. If a connection request has not been received, the DISM may be configured to return to the idle state of 1105.

Otherwise, if a connection request has been received in step 1110, the DISM may be further configured to attempt to establish a link or connection with the source synchronization module, in step 1115. The connection may be implemented using handshake signals, TCP/IP, or similar protocols.

In step 1120, the DISM may be configured to receive an activation request from a source synchronization module. The activation request may be part of a handshake protocol, another received message or similar notification. Once activated, the DISM may be further configured to receive data, e.g., a message history, from the source synchronization module in step 1125.

In step 1130, the DISM may be configured to combine the received data, e.g., a message history, with any existing message history cached or temporarily stored on the current computing platform. A source computing platform may not contain enough memory space to store a complete message history. Accordingly, the current computing platform may be the message server 820 which may be configured to maintain a partial or full message history in a memory.

In step 1135, the DISM may be configured to determine if the current platform is the destination platform for the data from the source synchronization module. The data received may contain a destination code, e.g., a destination address, which may designate the destination computing platform. Each synchronization module may be assigned a location code where the DISM may compare the destination code with the location of the destination computing platform.

If the comparison is true, in step 1140 with reference to FIG. 11B, the DISM may be configured to convert the received data, e.g., a message history, into a predetermined or pre-selected format. The format may be configured by a user of the destination/intermediate computer system via a menu option, a command line prompt, an icon, etc. The DISM may convert the data in response to receipt of a signal indicating that all of the data from the source computing platform or the DISM may convert the data as the data is received from the source computing platform.

In step 1145, the DISM may be configured to store the converted data in a predetermined location. The location may be specified by a user of the destination/intermediate computer system via a menu option, a command line prompt, an icon, etc. The DISM may be further configured to send a completion signal or message to the source synchronization module in response to storing the converted data, in step 1150. Subsequently, the DISM may be configured to return to the idle state of 1105 with reference to FIG. 11A.

Returning to step 1135, if the current computing platform is not the destination platform, the DISM may be configured to determine if the destination computing platform is available, in step 1155. If the destination computing platform is not available, the DISM may be configured to temporarily store the converted data in an available memory location, in step 1160. The DISM may be further configured to transmit a signal or message to the source computing platform that the destination computing platform is currently unavailable, in step 1165.

In step 1170, the DISM may be further configured to prompt a user for a re-attempt to establish communication with the destination computing platform. If the there is a re-attempt, the DISM may asynchronously or periodically attempt to establish a connection with the destination computing platform by returning to step 1155. Otherwise, the DISM may be configured to return to the idle state of step 1105.

Returning to step 1155, if the destination computing platform is available and the connection is established, the DISM may be further configured to activate the destination synch module of the destination computing platform, in step 1175 with reference to FIG. 11C. The destination synchronization module may be activated as part of a protocol handshake, receiving an activation signal or message, etc. The DISM may be further configured to transfer the data to the destination computing platform in step 1180.

The DISM may be further configured to wait for a completion signal or message from the completion of the data transfer in step 1185. If the message is not received, the source synchronization module returns to the wait state of step 1190. Otherwise, the source synchronization module may be further configured to return to the idle state of 1105 of FIG. 11A.

The present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

What has been described and illustrated herein are preferred embodiments of the invention along with some of their variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for transferring chat history, comprising:
  establishing a messaging session between a first device having a first message format, and a second device having a second message format, said messaging session triggering a synchronization of chat history;
  sending an activate message to said second device;
  receiving an activated message response; and
  synchronizing, in response to said activated message, said chat history from said first device with a plurality of past messages in said first message format to said second device with a plurality of past messages in said second message format.

2. The method for transferring chat history according to claim 1, further comprising:
  storing a converted chat history in a pre-determined network storage device.

3. The method for transferring chat history according to claim 2, further comprising:
  transmitting a completion message in response to completion of said synchronizing.

4. The method for transferring chat history according to claim 1, further comprising:
  transmitting a completion message in response to completion of said synchronizing.

5. An apparatus for synchronizing a chat history, comprising:

an interface adapted to communicate with a destination device;

a memory configured to store a chat history comprising a plurality of past messages of a first data format;

an activation module to request and receive an activated message; and a processor configured, in response to said receipt of said activated message, to convert said chat history comprising said plurality of past messages from said first data format compatible with a first real-time chat system into a second data format compatible with a second real-time chat system, and to initiate synchronization of said converted chat history from said memory in response to an establishment of a messaging session through said interface with said destination device.

6. The apparatus for synchronizing a chat history according to claim 5, wherein:

said processor is further configured to report unavailability of said destination device in response to an initial non-establishment of said messaging session.

7. The apparatus for synchronizing a chat history according to claim 6, wherein:

said processor is further configured to provide another attempt of establishing said messaging session in response to said unavailability of said destination device.

8. The apparatus for synchronizing a chat history according to claim 5, wherein:

said processor is further adapted to activate a synchronization module on said destination device in response to said establishment of said messaging session, and to transfer said chat history in response to said activation of said synchronization module.

9. The apparatus for synchronizing a chat history according to claim 8, wherein:

said synchronization module of said destination device is adapted to receive said chat history, to convert said chat history to said second data format, and to store said converted chat history in a previously selected network storage device.

10. A system for synchronizing a chat history, comprising:

a communication network; a source device configured to transfer a chat history comprising a plurality of past messages of a first data format over said communication network;

a destination device configured to receive said chat history;

a source synchronization module associated with said source device; and a destination synchronization module associated with said destination device sends an activated message response to convert said chat history comprising said plurality of past messages from said first data format compatible with a first real-time chat system into a second data format compatible with a second real-time chat system, and to initiate synchronization of said converted chat history with said destination device in response to an establishment of a messaging session with said second real-time chat system.

11. The system for synchronizing a chat history according to claim 10, wherein:

said destination synchronization module is further configured to initiate transfer of said chat history in response to receiving a synchronization request at said source device.

12. The system for synchronizing a chat history according to claim 10, wherein:

said destination synchronization module is configured to determine a destination of said chat history.

13. The system for synchronizing a chat history according to claim 12, wherein:

said destination synchronization module is further adapted to combine additional chat data related to said chat history into a combined chat history.

14. The system for synchronizing a chat history according to claim 13, wherein:

said destination synchronization module is further adapted to transfer said combined chat history to a final destination device in response to a determination that said destination of said chat history is said final destination device.

15. The system for synchronizing a chat history according to claim 13, wherein:

said destination synchronization module is further adapted to transfer said chat history to a final destination device in response to a determination that said destination of said chat history is said final destination device.

16. The system for synchronizing a chat history according to claim 13, wherein:

said destination synchronization module is further configured to convert said chat history to a pre-selected data format in response to a determination that said destination of said chat history is said destination device.

17. The system for synchronizing a chat history according to claim 16, wherein:

said destination synchronization module is further configured to store said converted chat history in a predetermined location on said destination device.

* * * * *